United States Patent
Van Der Merwe et al.

(10) Patent No.: US 9,956,503 B2
(45) Date of Patent: May 1, 2018

(54) METHOD FOR SEPARATING A FEED MATERIAL CONTAINING IMMISCIBLE PHASES OF DIFFERENT DENSITIES

(71) Applicant: FORT HILLS ENERGY L.P., Calgary (CA)

(72) Inventors: Shawn Van Der Merwe, Calgary (CA); John Khai-Quang Diep, Burnaby (CA); Mohammed Reza Shariati, Coquitlam (CA); Gary Foulds, Calgary (CA)

(73) Assignee: Fort Hills Energy L.P., Calgary AB (CA)

( * ) Notice: Subject to any disclaimer, the term of this patent is extended or adjusted under 35 U.S.C. 154(b) by 0 days. days.

(21) Appl. No.: 15/701,213

(22) Filed: Sep. 11, 2017

(65) Prior Publication Data

US 2017/0368478 A1   Dec. 28, 2017

Related U.S. Application Data

(62) Division of application No. 13/252,102, filed on Oct. 3, 2011, now Pat. No. 9,789,422.

(30) Foreign Application Priority Data

Nov. 2, 2010 (CA) ........................................ 2719874

(51) Int. Cl.
*C10G 1/04* (2006.01)
*C10G 1/00* (2006.01)
*B01D 17/02* (2006.01)
*B01D 17/12* (2006.01)

(52) U.S. Cl.
CPC ......... *B01D 17/0214* (2013.01); *B01D 17/12* (2013.01); *C10G 1/045* (2013.01)

(58) Field of Classification Search
None
See application file for complete search history.

(56) References Cited

U.S. PATENT DOCUMENTS 5,223,148 A * 6/1993 Tipman .................... B03B 9/02
                                                208/390

* cited by examiner

*Primary Examiner* — Thomas M Lithgow
(74) *Attorney, Agent, or Firm* — Knobbe Martens Olson & Bear LLP

(57) ABSTRACT

A solvent diluted bitumen is produced by a method that includes adding paraffinic solvent to bitumen froth to form a solvent diluted bitumen froth, and discharging the solvent diluted bitumen froth into a vessel, such that settlement of the solvent diluted bitumen froth in the interior of the vessel establishes a heavier phase zone, a lighter phase zone, and an interface. A discharge point is located above the interface and within the lighter phase zone. Lighter phases separate up toward an overflow outlet of the vessel while heavier phases separate down toward an underflow outlet of the vessel. The solvent diluted bitumen is collected from the overflow outlet, and a solvent diluted underflow stream is collected from the underflow outlet.

20 Claims, 3 Drawing Sheets

METHOD FOR SEPARATING A FEED MATERIAL CONTAINING IMMISCIBLE PHASES OF DIFFERENT DENSITIES

CROSS-REFERENCE TO RELATED APPLICATIONS

This application is divisional application of U.S. application Ser. No. 13/252,102, filed Oct. 3, 2011, which claims the priority of Canadian Patent Application No. 2,719,874 filed Nov. 2, 2010. The complete disclosures of the above-referenced applications are herein expressly incorporated by references in their entireties

FIELD OF THE INVENTION

This invention relates to methods and equipment for separating hydrocarbon components from aqueous slurries with particles in a diluted bitumen froth feed.

BACKGROUND OF THE INVENTION

Oil sand extraction processes are used to liberate and separate bitumen from oil sand so the bitumen can be further processed. Numerous oil sand extraction processes have been developed and commercialized using water as a processing medium. One such water extraction process is the Clarke hot water extraction process, which recovers the bitumen product in the form of a bitumen froth stream.

The bitumen froth stream produced by the Clarke hot water process contains water in the range of 20 to 45%, more typically 30% by weight and minerals from 5 to 25%, more typically 10% by weight which must be reduced to levels acceptable for downstream processes.

At Clarke hot water process temperatures ranging from 40 to 80° C., bitumen in bitumen froth is both viscous and has a density similar to water. To permit separation by gravitational separation processes, commercial froth treatment processes involve the addition of a diluent to facilitate the separation of the diluted hydrocarbon phase from the water and minerals.

Initial commercial froth treatment processes utilized a hydrocarbon diluent in the boiling range of 170-400° C. commonly referred to as a naphtha diluent in a two stage centrifuging separation process. Limited unit capacity, capital and operational costs associated with centrifuges promoted applying alternate separation equipment for processing diluted bitumen froth such as those described in Canadian Patent No. 1,267,860 (Hann) and Canadian Patent No, 1,293,465 (Hyndman et al). In these processes, the diluent naphtha was blended with the bitumen froth at a weight ratio of diluent to bitumen (D/B) in the range of 0.3 to 1.0 and produced a diluted bitumen product with typically less than 4 weight percent water and 1 weight percent mineral which was suitable for dedicated bitumen upgrading processes. Generally, operating temperatures for these processes were specified such that diluted froth separation vessels were low pressure vessels with pressure ratings less than 105 kPag. Other froth separation processes using naphtha diluent such as those described in U.S. Pat. No. 3,901,791 (Baillie) and Canadian Patent No. 2,021,185 (Tipman et al) involve operating temperatures that require froth separation vessels rated for pressures up to 5000 kPag. Using conventional vessel sizing methods, the cost of pressure vessels and associated systems designed for and operated at this high pressure limits the commercial viability of these processes.

Heavy oils such as bitumen are sometimes described in terms of relative solubility as comprising: firstly, a pentane soluble fraction which, except for higher molecular weight and boiling point, resembles a distillate oil; secondly, a less soluble resin fraction; thirdly, a paraffinic insoluble asphaltene fraction characterized as high molecular weight organic compounds with sulphur, nitrogen, oxygen and metals that are often poisonous to catalysts used in heavy oil upgrading processes. It is well known in the art that paraffinic hydrocarbons precipitate asphaltenes from heavy oils to produce deasphalted heavy oil with contaminate levels acceptable for subsequent downstream upgrading processes. Descriptions of deasphalting operations may be found in U.S. Pat. No. 3,278,415 (Doderenz et al), U.S. Pat. No. 2,188,013 (Pilat et at) and U.S. Pat. No. 2,853,426 (Peet et al). In these processes contaminates follow the asphaltenes when the asphaltenes are precipitated by paraffinic solvents having compositions from C3 to C10 when the heavy oil is diluted with 2 to 10 times the volume of solvent.

High water and mineral content distinguish bitumen froth from the heavy oil deasphalted in the above processes. Some early attempts to adapt deasphalting operations to processing bitumen from oil sands are identified in U.S. Pat. No. 3,779,902 (Mitchell et al) and U.S. Pat. No. 4,634,520 (Angelov et al). These patents generally disclose precipitation of essentially a mineral free, deasphalted product, the ability to vary the amount of asphaltene precipitated, and the enhancement of asphaltene precipitation by addition of water and chemical agents.

Recent investigations in treating bitumen froth with paraffinic solvents as identified in Canadian Patents 2,149,737 (Tipman et al) and 2,217,300 (Tipman et al) have resulted in paraffinic froth treatment processes described in Canadian Patents 2,200,899 (Tipman et al); 2,232,929 (Birkholz et al); 2,350,907 (Picavet et al); 2,454,942 (Hyndman et al) and U.S. Pat. No. 6,007,709 (Duyvesteyn et al). Central to these processes are froth settling vessels (FSV) arranged in a counter-current flow configuration. In process configurations, counter-current flow refers to a processing scheme where a process medium is added to a stage in the process to extract a component in the feed to that stage, and the medium with the extracted component is blended into the feed of the preceding stage. Counter-current flow configurations are widely applied in process operations to achieve both product quality specifications and optimal recovery of a component with the number of stages dependent on the interaction between the desired component in the feed stream and the selected medium, and the efficiency of stage separations. In deasphalting operations processing heavy oil with low mineral solids, separation using counter-current flow can be achieved within a single separation vessel. However, rapidly setting mineral particles in bitumen froth preclude using a single separation vessel as this material tends to foul the internals of conventional deasphalting vessels.

FIG. 1 illustrates a two stage process such as disclosed in Canadian Patent No. 2,454,942 (Hyndman et al). In this process, bitumen froth 100 at 80-95° C. is mixed with overflow product 102 from a second stage FSV 104 at mixer 101 such that the solvent to bitumen ratio in the diluted froth stream 106 to a first stage FSV 108 is above the threshold to precipitate asphaltenes from the bitumen froth. For paraffinic froth treatment processes with pentane as the paraffinic solvent, the threshold solvent to bitumen ratio as known in the art is about 1.2 which significantly increases the feed volume to the FSV. The first stage FSV 108 separates the diluted froth into an overflow stream 110 comprising a partially to fully deasphalted oil with a low water and mineral content, and an underflow stream 112 containing the rejected asphaltenes, water, and minerals together with residual maltenes from the bitumen feed and solvent due to the stage efficiency. First stage underflow stream 112 is mixed with a paraffinic solvent 114 at mixer 115 to form a diluted feed 116 for the second stage FSV 104. The second stage FSV 104 recovers residual maltenes from the bitumen and solvent. It is important to recognize the different process functions of stages in a counter-current process configuration. In this case, the operation of first stage FSV 108 focuses on product quality and the second stage FSV 104 focuses on recovery of residual hydrocarbon from the underflow of the first stage FSV. Another aspect is that the process is operated at temperatures that require controlling the pressure in either stage such that solvent vaporization in the FSVs is limited. It is also understood by persons skilled in use of counter-current flow schemes that various aspects of the flow scheme can be modified to provide an optimized process configuration based on the characteristics of the feed or product. These aspects include the use of additional stages, the introduction of the feed stream at different stages within the overall flow scheme, and bypassing a portion of the media stream around a stage.

Independent of the stage in which the separation vessel is located, the introduced feed is separated into two outlet streams: an overflow and an underflow stream. By introducing feed between the two outlet streams, the vessel separation is also classed as counter-current by internal flow patterns. In contrast, vessels such as disclosed in Canadian patent 2,527,058 (Hann) are distinguished by vessel separations classed by internal flow patterns as co-current.

For all gravity based separation schemes, whether counter-current or co-current flow, the separation principles are governed by Stokes' Law whereby particles tend to separate in fluid media at a rate dependent on the viscous properties of the fluid and the mass density and size differential of the particles. In some applications, the solid phase is a liquid which forms immiscible droplets in the liquid phase.

For settlers that employ counter-current flow patterns, significant precedent literature exists to specify the vessel arrangement. In process industries, these vessels are frequently identified as clarifiers if the prime focus is on the overflow product and thickeners if the prime focus is on underflow product. In some cases, a single vessel due to specific fluid properties can encompass both objectives. In paraffinic froth treatment, the overflow stream accounts for a significant portion of the feed stream. The following discussion focuses on the adaptation of conventional clarifier procedures for specifying a first stage FSV producing a high quality deasphalted oil product from diluted bitumen feed. Similar adaptation of conventional thickener procedures apply to the specification of the last stage FSV.

Sizing of conventional clarifiers is derived from Stokes' Law for gravity settling of solids either as solid particles or immiscible liquid drops in a liquid phase. In some clarification applications, such as American Petroleum Institute (API) separators for treating water for environmental discharges, performance requirements based on Stokes' Law are reflected in regulations. However, many parameters that affect the settling behaviours cannot be adequately predicted in advance particularly, when coalescence, flocculation or other sedimentation enhancement processes are involved. Where coalescence, flocculation or other sedimentation enhancement processes occur naturally or artificially, settling tests are conducted that cover the expected operating envelope for the settling vessel. This includes the use of chemical additives, mixing or other techniques known to affect settler performance. Generally, the testing involves static jar settling tests to determine the bulk settling rate and involves mixing the feed and allowing the mixed feed stream to settle over time. Perry's Chemical Engineers Handbook 6th Edition outlines on pages 19-53 basic sedimentation test procedures available. Frequently the settling occurs in fluids that are relatively opaque and optical systems are employed in the testing.

Conversion of settling rates obtained from static test data by published design procedures tend to scale a clarifier for only 50% of the observed settling rate. Examples of such published procedures may be found in references such as Mineral Processing Plant Design, Practice And Control Proceedings: Andrew Mular, Doug Halbe, Derek Barratt SME 2002, or Perry's Chemical Engineers Handbook, $6^{th}$ Edition, page 19-54. The scaling for 50% of the observed settling rate establishes the required settling area for the clarifier, and therefore the vessel diameter for cylindrical vessels such as settlers. The vessel diameter is proportionally related to the wall thickness required to contain the pressure of the vessel contents.

The settling test also provides static detention times to achieve the separation which represents the volume required in the clarifier above the interface to achieve the overflow quality. To account for turbulence and non-uniform flow, practitioners apply a detention factor when setting the height between the interface and the overflow such as disclosed in FIG. 19-71 of Perry's Chemical Engineering Handbook $6^{th}$ Edition where detention factors range from 60% to 25%. For froth settling vessels, static detention times in conjunction with applied detention factors result in a diameter to depth ratio of 1:1. This volume is directly related to the weight of the vessel which affects the structural support and foundation requirements for the vessel. The larger the size of the vessel as influenced by design factors, the greater the vessel cost. Limiting the size of the vessel by reducing the height may be accomplished by making the cone angle on the vessel bottom relatively low (up to 10 degrees to horizontal). Rakes or similar scraping devices are used in such vessels to aid transport of solids on the low cone angle to a centre discharge.

The fact that current settler vessel design techniques apply design factors for both settling rates and detention times which tend to increase the size of the vessel and significantly increase the cost of the vessels is well known to the applicant.

SUMMARY OF THE INVENTION

To address this issue, applicant has developed a novel settling vessel and method that results in a smaller settling vessel with resulting reduced material and fabrication costs while still maintaining the performance separation performance objectives.

Accordingly, there is provided apparatus for separating a feed containing immiscible phases of different densities comprising:

a vessel having a top, side walls, and a base defining an interior having a height and a diameter;

a feed inlet to deliver feed to the interior whereby settling of the feed establishes a heavier phase zone in the vicinity of the sloped base and a lighter phase zone above an interface with the heavier phase zone;

an overflow outlet for the lighter phase zone;

an underflow outlet for the heavier phase zone;

whereby the height/diameter ratio of the vessel, the dimensions and position of the feed inlet and the fluid properties of the feed are selected to allow a feed velocity of the feed discharging from the feed inlet into the interior to dissipate in the lighter phase zone as the discharged feed entrains lighter phase material above the interface and spreads across the vessel interior such that the lighter phases of the feed separate up to the overflow outlet and the heavier phases separate down to the underflow outlet.

In a further aspect, there is provided a method for separating a feed containing immiscible phases of different densities comprising:

providing a vessel having a top, side walls, and a base defining an interior having a height and a diameter such that settlement of feed in the interior of the vessel establishes a heavier phase zone in the vicinity of the base and a lighter phase zone above an interface with the heavier phase zone;

discharging feed at a feed velocity into the interior of the vessel via a feed inlet, the height/diameter ratio of the vessel, the dimensions and position of the feed inlet and the properties of the feed being selected such that the feed velocity of the feed dissipates in the lighter phase zone as the discharged feed entrains lighter phase material above the interface and spreads across the vessel interior;

collecting the lighter phases of the feed as the lighter phases separates up to an overflow outlet; and collecting the heavier phases of the feed as the heavier phases separate down to an underflow outlet.

The apparatus and method describes find particular application in the handling of a bitumen froth feed.

BRIEF DESCRIPTION OF THE DRAWINGS

Aspects of the present invention are illustrated, merely by way of example, in the accompanying drawings in which.

DESCRIPTION OF THE PREFERRED EMBODIMENTS

A requirement of counter-current settling vessels is to inject the feed stream between the overflow and underflow outlets in a manner that permits effective use of the settler cross sectional area. Generally, this is achieved by a deflector baffle or plate or other device that redirects and injects the feed perpendicular to the bulk flows within the separation zone of the settler. The resulting turbulence and mixing around this feed zone is directly attributed to the design factors that are applied to settling rates and detention times when sizing settling vessels as discussed above.

Computational fluid dynamics (CFD) modelling techniques described in literature such as Ersteeg et al., "An Introduction to Computational Fluid Dynamics: the Finite Volume Method", Addison Wesley Longman Ltd., 1995 or Freziger et al. "Computational Methods for Fluid Dynamics", 2nd Edition, Springer, 1999, permit detailed investigations of hydrodynamic flow patterns. The general concept of CFD modelling is to solve numerically the fundamental equations of fluid motion over a connected array of computational cells that compose the geometry of interest. CFD modelling is supported by detailed understanding of the fluid dynamics and transport properties for fluids either from literature or by specific tests, modelling methods for turbulence involving semi-empirical constants to tune the model and modelling of multiple phases reflecting particle/droplet diameters, phase densities and fluid viscosity.

Initial CFD modelling studies with a deflector plate at various positions and configurations in the feed pipe confirmed the applicability of design factors to conventional settler sizing. It was only when applicant removed the deflector plate and the feed was allowed to discharge vertically toward the bottom of the vessel that the design factors with respect to the settling rate could be reduced and the diameter of the settler vessel thereby reduced. Subsequent CFD modelling by applicant established trade-offs between the location of the feed pipe, the dimensions of the feed pipe and the interface between the phases as detailed below.

Figure 2:
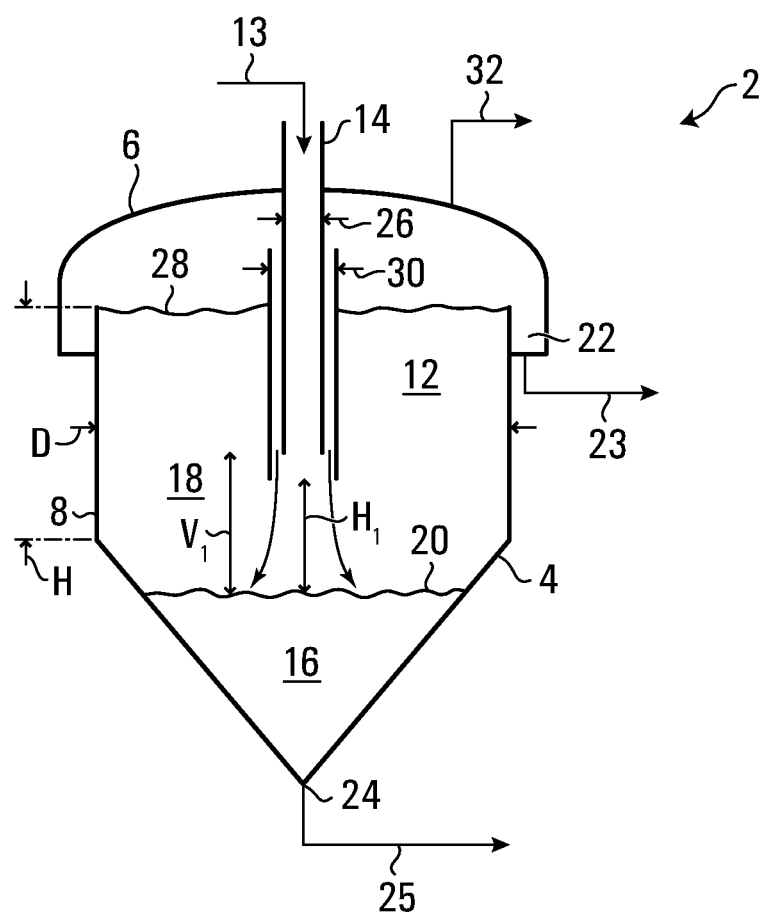
FIG. 2 is a schematic side elevation view of the bitumen froth settler apparatus according to a first embodiment with an external launder.

Referring to FIG. 2, there is shown a first embodiment according to the invention of apparatus 2 for separating a feed containing immiscible phases of different densities into separate phases. In a preferred embodiment, the feed is a hydrocarbon feed to be separated into lighter and heavier phase components. The apparatus comprises a vessel 4 having a top 6, side walls 8, and a base 10 defining an interior 12 having a side wall height H and a diameter D. In a preferred arrangement, side walls 8 are generally cylindrical and top 6 is generally domed. Base 4 is preferably generally sloped and, more preferably, has a generally conical configuration.

A feed inlet in the form of a feed pipe 14 is provided at the top of vessel 4 to deliver feed 13 into interior 12 of the vessel. At steady state within the vessel, the feed settles due to gravity to establish a heavier phase zone 16 in the vicinity of sloped base 4 and a lighter phase zone 18 above an intermediate interface 20 with the heavier phase zone.

An overflow outlet in the form of an external overflow launder 22 extends about the outer perimeter of walls 8 adjacent the top of the vessel to collect overflow of the lighter phase zone. In alternative embodiments, with appropriate allowances for stream flow lines, the overflow launder may be at least one internal launder adjacent the top of the vessel.

At conical base 4, an underflow outlet 24 for the heavier phase zone is provided. Preferably, underflow outlet 24 is positioned adjacent an apex 26 of the conical base and flow therethrough is controlled by a valve or pump(not shown). The valve or pump serve to regulate the interface level between the lighter and heavier phases.

A person skilled in the art of material separation will recognize light phase settling occurs in a hydrocarbon continuous phase and heavy phase settling occurs in a largely aqueous continuous phase with the interface representing a discontinuity between the hydrocarbon and aqueous phase. However, conventional methods outlined above for the sizing of settler vessels are derived for settling within one continuous phase consequently those skilled in the art of gravitational separation will select one phase as controlling for sizing the settler vessel and largely ignore the other phase. Applicant has determined that the interface between the light and heavy phases permits assigning clarification and thickening requirements to distinct zones within the settler. This insight led to the notion of directing the feed pipe vertically downward from an elevation that allowed the discharge momentum of the feed at the feed entry point into the vessel to be adequately dissipated by interaction with the fluid of the light phase zone to maintain a stable interface. This dissipation of momentum and the interaction with the phase interface can be modelled by current CFD techniques and is supported by limited physical testing which has confirmed the CFD model prediction.

Figure 1:
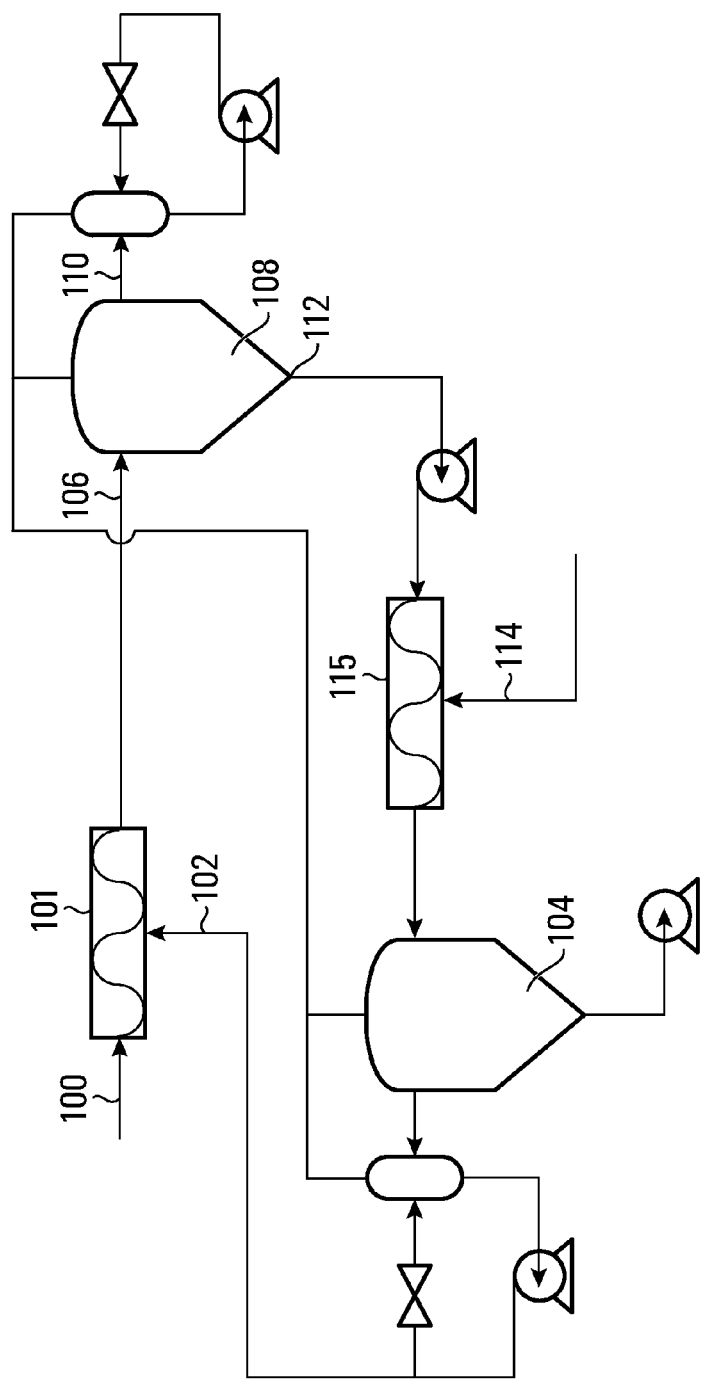
FIG. 1 is a schematic view of a two stage forth settler vessel configuration using counter-current flow in accordance with the prior art.

Returning to FIG. 2, in either clarification or thickening, the diameter D of the vessel is selected to provide at least a cross-sectional area to allow an upwardly rising velocity $v_1$ of the lighter phase material toward the top of the vessel to overflow into launder 22 as a product stream 23. The rising velocity is less than the minimum settling rate as determined from settling test spanning the operating envelope within the vessel with acceptable levels of contaminants for product stream 23.

Where clarification is the primary function of the settler, such as a first stage froth settler vessel illustrated at 108 in FIG. 1, the minimum height H for the generally cylindrical portion of the vessel, as measured between overflow surface 28 of lighter phase zone 18 and the intersection of the cylindrical wall 8 with the conical base 4 (FIG. 2), provides a separation distance $h_1$ between the discharge of the feed pipe 14 and the interface 20 between lighter phase zone 18 and heavier phase zone 16 that allows the velocity momentum at the discharge of the feed pipe to be dissipated by entrainment of light phase fluid such that the interface is stable. Determining the minimum separation distance $h_1$ involves conducting a hydraulic analysis taking into account the fluid properties of the feed and the light phase zone, and the feed pipe diameter including flow stream appurtenances.

When thickening is the primary function of the settler, such as a second stage froth settler vessel illustrated at 104 in FIG. 1, the volume of the conical base is selected to provide a retention time as established by conventional testing and sizing methods to minimize hydrocarbon values while ensuring rapidly settling solids or emulsions stably discharge in underflow stream 25 (FIG. 2). As underflow streams in paraffinic froth treatment processes, such as illustrated in FIG. 1, are smaller than the respective overflow streams and contain rapidly settling solids, the required retention time for thickening is generally provided by the volume of the conical base. The zone between the clarification and thickening zones identifies the range over which the interface needs to be controlled by a valve or pump. In cases where the hydrocarbon feed contains a significant volume of contaminants, such as water, the minimum height H for the generally cylindrical portion of the vessel as measured between the overflow surface 28 of the lighter phase and the intersection of the cylindrical wall 8 with the conical base 4 required for clarification would be increased by an incremental height to increase the volume of the cone to provide the required retention time for separation.

Given the settler vessel diameter is established by the settling rate, the volume with the cone for thickening retention time depends on the angle of the cone. The angle of the cone may be lower than the angle of repose for the settled solids if the settler uses rakes or other means to transport the settled solids to the underflow outlet 24. Having the angle of the cone greater than the angle of repose of the settled solids allows for withdrawal of the underflow stream without mechanical aids such as rakes or mixers.

If the retention time in the thickening zone of the settler is excessive based on settling test results, differential settling with the thickener zone can create operation instabilities. To address this issue, conventional cone flush media such as disclosed in U.S. Pat. No. 3,954,414 (Davitt) may be used.

Another possible option is the use of shear thinning pump loops as outlined in F. Baczek, "Paste Thickening Design Evolving to Higher Capacities and Efficiencies", International Minimizing Supplement to Paste Tailing Management, March 2007. Still further, schemes such as withdrawal of a middling stream as disclosed in Canadian Patent No. 2,323,929 (Birkholtz et al.) can be applied to minimize operational instabilities.

Bitumen froth feeds can contain entrained and/or dissolved gases. In addition, the solvent that is part of the froth stream may release gas vapours at the operating temperatures and pressures of the vessel. If the operating conditions of the settler are not set to prevent the evolution of gases from the bitumen froth feed, then provisions are needed to prevent the gas from rising within the interior of the vessel creating flotation convection currents that will tend to upset the separation process. To address this problem, and as best shown in FIG. 2, the settler may include a degassing means in the form of a pipe 30 which acts to disengage vapour from the bitumen froth feed. Degassing pipe 30 is preferably mounted co-axially about feed pipe 14 and extends further into the interior of the vessel than the feed pipe, and may include a perforated section (not shown). The degassing pipe provides a path for dissolved gases that may be released from bitumen froth feed 13 to be vented without upsetting the settling conditions in the vessel. If gas is permitted to vent directly into the lighter fluid phase zone 18, it can change the zone hydraulics and entrain contaminants in the overflow product stream within launder 22.

The vessel of FIG. 2 also preferably includes a venting outlet 32 in the form of a pipe adjacent the top of the vessel. Vapours released either from feed 13 or the vaporization of separated light phase material are collected at the top of the vessel for release through the vent pipe. The vent pipe may be used to regulate the pressure in the settler vessel by controlling the rate at which vapours are released.

Figure 3:
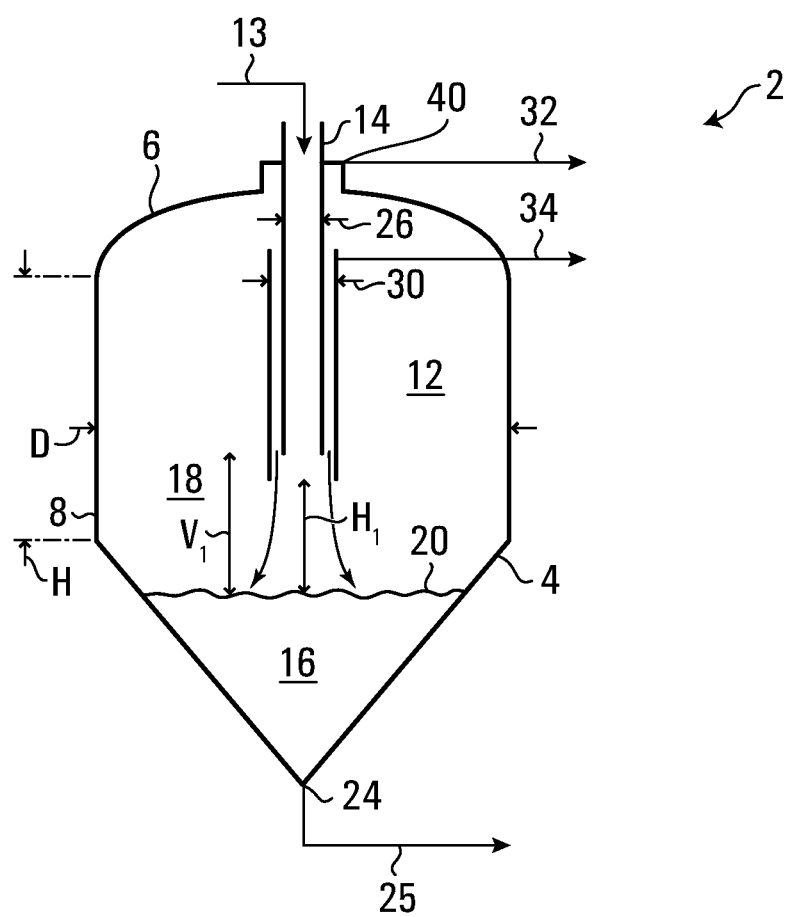
FIG. 3 is a schematic view of the bitumen froth settler apparatus according to a second embodiment with a sealed top without a launder.

FIG. 3 shows an alternative embodiment of the settler apparatus according to the invention. In FIG. 3, features which are identical to the features of the vessel illustrated in FIG. 2 have the same reference number. In the embodiment of FIG. 3, the operation of the vessel is fundamentally the same as described above. Instead of having a launder overflow outlet, the vessel of FIG. 3 relies on the overflow product filling the upper portion of the vessel. Overflow product stream 23 exits the vessel via an overflow outlet 40 at the top of the vessel. In other words, the vapour space above the liquid level 28 of the vessel of FIG. 2 is now filled with overflow product. In this arrangement, degassing pipe 30 vents externally to the vessel via line 34. Lack of an overflow launder makes the vessel of FIG. 3 potentially easier to fabricate. In the vessel of FIG. 3, the height H of the vessel is measured between the intersection of the cylindrical side wall 8 with the conical base and the tangent line at which the top cover 6 joins the side wall 8.

EXAMPLE 1

Based on a first stage froth settler vessel processing 2440 m³/hour of diluted bitumen froth feed with external launder 0.5 meters wide with a 10 degree slope and a 60 degree cone, the table below compares the dimensions of a settler vessel designed according to conventional sizing methods and according to the principles of the present invention:

|  | Conventional Settler with horizontal feed injection | Settler according to the present invention |
| --- | --- | --- |
| Vessel Diameter (D) meters | 18.6 | 13.4 |
| Vessel Sidewall (H) meters | 10.0 | 16.9 |
| Vessel Surface for pressure containment, square meters | 2955 | 2008 |
| Vessel Contained Liquid Volume, cubic meters | 4176 | 2925 |

The settler of the present invention has both a reduced surface area and a reduced volume which for the same operating pressure provides significant fabrication cost savings while being capable of handling the same volume of feed.

Although the present invention has been described in some detail by way of example for purposes of clarity and understanding, it will be apparent that certain changes and modifications may be practised within the scope of the appended claims.

What is claimed is:

1. A method for producing solvent diluted bitumen, the method comprising:
    adding paraffinic solvent to bitumen froth to form a solvent diluted bitumen froth;
    discharging a feed comprising the solvent diluted bitumen froth into a vessel, the vessel comprising a top, side walls, and a base defining an interior having a height and a diameter defining a height/diameter ratio, such that settlement of the solvent diluted bitumen froth in the interior of the vessel establishes a heavier phase zone in a lower section of the interior, a lighter phase zone in an upper section of the interior, and an interface in between the heavier phase zone and the lighter phase zone;
    wherein the discharging of the feed into the interior of the vessel is performed via a feed inlet having a discharge point located above the interface and within the lighter phase zone, the height/diameter ratio of the vessel, dimensions and position of the feed inlet, properties of the feed, and a feed velocity at the discharge point being selected such that the feed velocity of the feed dissipates in the lighter phase zone as the discharged feed entrains lighter phase material above the interface and spreads across the interior of the vessel, and lighter phases separate up toward an overflow outlet of the vessel while heavier phases separate down toward an underflow outlet of the vessel;
    collecting the solvent diluted bitumen from the overflow outlet; and
    collecting a solvent diluted underflow stream from the underflow outlet.
2. The method of claim 1, further comprising degassing vapor from the feed.
3. The method of claim 2, wherein the degassing comprises flowing the vapor from the discharge point out of the vessel via a degassing path.
4. The method of claim 3, wherein the vapor that is released via the degassing path comprises dissolved gases that are released from the feed upon discharge via the feed inlet.
5. The method of claim 3, wherein the degassing path comprises a gas inlet adjacent the discharge point within the vessel and a gas outlet outside of the vessel.
6. The method of claim 5, wherein the degassing path has an annular cross-section.
7. The method of claim 6, wherein the degassing path is defined by a degassing pipe arranged around the feed inlet.
8. The method of claim 7, wherein feed inlet comprises a feed pipe extending vertically downward through the top of the vessel.
9. The method of claim 8, wherein the discharge point is an open pipe end of the feed pipe.
10. The method of claim 1, wherein the vessel is a first stage froth separation vessel, and the feed is solvent diluted bitumen froth.
11. The method of claim 1, wherein the top of the vessel is domed and the vessel is configured for pressure containment of the feed within the interior.
12. The method of claim 9, wherein the side walls are cylindrical and extend down from the domed top, and the base is conical and extends down from a lower part of the side walls.
13. The method of claim 1, further comprising controlling a level of the interface within the vessel.
14. The method of claim 13, wherein the controlling of the level of the interface comprises controlling a flow rate of the solvent diluted underflow stream.
15. A method for producing an enriched hydrocarbon material from a feed containing immiscible phases of different densities, the feed being a hydrocarbon contaminated with water and minerals and diluted with a solvent, the method comprising:
    discharging the feed into a vessel comprising a top, side walls, and a base defining an interior having a height and a diameter defining a height/diameter ratio, such that settlement of the feed in the interior of the vessel establishes a heavier phase zone depleted in hydrocarbons in a lower section of the interior, a lighter phase zone enriched in hydrocarbons in an upper section of the interior, and an interface in between the heavier phase zone and the lighter phase zone;
    wherein the discharging of the feed into the interior of the vessel is performed via a feed pipe that is linear, vertical, spaced-apart equidistantly from the side walls to extend down a center axis of the vessel, and configured for discharging the feed vertically downward into the lighter phase zone at a discharge point located above the interface, the height/diameter ratio of the vessel, dimensions and position of the feed pipe, properties of the feed, and a feed velocity at the discharge point being provided such that the feed velocity of the feed dissipates in the lighter phase zone as the discharged feed entrains lighter phase material above the interface and spreads across the interior of the vessel, and lighter phases separate up toward an overflow outlet of the vessel while heavier phases separate down toward an underflow outlet of the vessel;
    collecting the enriched hydrocarbon material from the overflow outlet; and
    collecting a solvent diluted underflow stream from the underflow outlet.
16. A method for producing solvent diluted bitumen, the method comprising:
    adding paraffinic solvent to bitumen froth to form a solvent diluted bitumen froth;
    discharging the solvent diluted bitumen froth into a vessel as a feed into a vessel, and separating the solvent diluted bitumen froth to produce a solvent diluted bitumen as an overflow stream and solvent diluted tailings as an underflow stream;

controlling gravity separation in the vessel such that settlement of the solvent diluted bitumen froth in the interior of the vessel establishes a heavier phase zone in a lower section of the vessel, a lighter phase zone in an upper section of the vessel, and an interface in between the heavier phase zone and the lighter phase zone, and the feed is discharged into the vessel within the lighter phase zone above the interface so that a feed velocity of the feed is dissipated in the lighter phase zone and spreads across the vessel above the interface while lighter phases separate up toward an overflow outlet of the vessel and heavier phases separate down toward an underflow outlet of the vessel;

collecting the solvent diluted bitumen from the overflow outlet of the vessel; and collecting a solvent diluted underflow stream from the underflow outlet of the vessel.

17. The method of claim 16, wherein the vessel comprises:

a domed top, cylindrical side walls, and a conical base defining an interior; and a feed pipe extending through the domed top into the interior of the vessel, the feed pipe having a discharge point located within the lighter phase zone, wherein the feed pipe is linear, vertical, spaced-apart equidistantly from the cylindrical side walls to extend down a center axis of the vessel, and configured for discharging the feed vertically downward into the lighter phase zone.

18. The method of claim 17, wherein the vessel is configured for pressure containment of the feed within the interior.

19. The method of claim 18, further comprising regulating a pressure within the vessel, wherein the regulating comprises controlling a rate at which vapors accumulated in the vessel are released by a venting outlet.

20. The method of claim 17, wherein the discharge point is positioned at an elevation above the interface such that a discharge momentum of the feed at the discharge point is dissipated by interaction with the lighter phase zone such that the interface is stable.

* * * * *